(12) United States Patent
Smolic et al.

(10) Patent No.: US 10,349,127 B2
(45) Date of Patent: Jul. 9, 2019

(54) METHODS FOR CREATING AND DISTRIBUTING ART-DIRECTABLE CONTINUOUS DYNAMIC RANGE VIDEO

(71) Applicants: Disney Enterprises, Inc., Burbank, CA (US); Eidgenoessische Technische Hochschule Zurich (ETH Zurich), Zurich (CH)

(72) Inventors: Aljoscha Smolic, Aarau (CH); Alexandre Chapiro, Zurich (CH); Simone Croci, Mendrisio (CH); Tunc Ozan Aydin, Zurich (CH); Nikolce Stefanoski, Zurich (CH); Markus Gross, Zurich (CH)

(73) Assignees: Disney Enterprises, Inc., Burbank, CA (US); Eidgenoessische Technische Hochschule Zurich (ETH Zurich), Zurich (CH)

( * ) Notice: Subject to any disclaimer, the term of this patent is extended or adjusted under 35 U.S.C. 154(b) by 420 days.

(21) Appl. No.: 14/861,587

(22) Filed: Sep. 22, 2015

(65) Prior Publication Data

US 2016/0353164 A1    Dec. 1, 2016

Related U.S. Application Data

(60) Provisional application No. 62/169,465, filed on Jun. 1, 2015.

(51) Int. Cl.
*H04N 7/18* (2006.01)
*H04N 21/4402* (2011.01)
(Continued)

(52) U.S. Cl.
CPC ....... *H04N 21/4402* (2013.01); *G11B 27/031* (2013.01); *H04N 19/00* (2013.01); *H04N 19/186* (2014.11); *H04N 21/845* (2013.01)

(58) Field of Classification Search
CPC .. G06K 9/00; G06K 9/40; G06K 9/36; G06K 9/03
(Continued)

(56) References Cited

U.S. PATENT DOCUMENTS 7,929,753 B2 *   4/2011   Bezryadin ............ H04N 1/6027
                                                        345/591
2008/0123942 A1   5/2008   Bezryadin

FOREIGN PATENT DOCUMENTS

CN    101809617 A    8/2010
CN    103891294 A    6/2014

OTHER PUBLICATIONS

Aydin, T. O. et al., Dynamic range independent image quality assessment, ACM Transactions on Graphics (TOG)—Proceedings of ACM SIGGRAPH 2008, Aug. 2008, pp. 69:1-69:10, vol. 27—issue3, ACM, New York, NY, USA.
(Continued)

*Primary Examiner* — Anand S Rao
(74) *Attorney, Agent, or Firm* — Sheppard Mullin Richter & Hampton LLP

(57) ABSTRACT

Novel systems and methods are described for creating, compressing, and distributing video or image content graded for a plurality of displays with different dynamic ranges. In implementations, the created content is "continuous dynamic range" (CDR) content—a novel representation of pixel-luminance as a function of display dynamic range. The creation of the CDR content includes grading a source content for a minimum dynamic range and a maximum dynamic range, and defining a luminance of each pixel of an image or video frame of the source content as a continuous function between the minimum and the maximum dynamic
(Continued)

ranges. In additional implementations, a novel graphical user interface for creating and editing the CDR content is described.

32 Claims, 14 Drawing Sheets

(51) Int. Cl.
 *G11B 27/031* (2006.01)
 *H04N 19/00* (2014.01)
 *H04N 21/845* (2011.01)
 *H04N 19/186* (2014.01)

(58) Field of Classification Search
 USPC .................................................. 348/20–40
 See application file for complete search history.

(56) References Cited

OTHER PUBLICATIONS

Aydin, T. O. et al., Temporally coherent local tone mapping of HDR video, ACM Transactions on Graphics (TOG)—Proceedings of ACM SIGGRAPH Asia 2014, Nov. 2014, pp. 196:1-196:13, vol. 33—issue 6, ACM, New York, NY, USA.

Boitard, R. et al, Zonal brightness coherency for video tone mapping. Preprint dated Oct. 3, 2013 to appear in Signal Processing: Image Communication, Feb. 2014, pp. 229-246, vol. 29—issue 2, Elsevier B.V.

Broucke, R., Algorithm: ten subroutines for the manipulation of chebyshev series, Communications of the ACM, Apr. 1973, pp. 254-256, vol. 16—issue 4, ACM, New York, NY, USA.

Dolby Laboratories, Inc., Dolby vision white paper, http://www.dolby.com/us/en/technologies/dolby-vision/dolby-vision-white-paper.pdf, last accessed Aug. 30, 2016, pp. 1-9.

Drago, F. et al., Adaptive logarithmic mapping for displaying high contrast scenes, Eurographics 2003, Sep. 2003, pp. 419-426, vol. 22—issue 3, Blackwell Publishers, Oxford, UK.

Durand, F. et al., Fast bilateral filtering for the display of high-dynamic-range images, ACM Transactions on Graphics (TOG)—Proceedings of ACM SIGGRAPH 2002, Jul. 2002, pp. 257-266, vol. 21—issue 3, ACM, New York, NY, USA.

Eilertsen, G. et al., Evaluation of tone mapping operators for HDR-video, Computer Graphics Forum Special Issue Proceedings of Pacific Graphics, Oct. 2013, pp. 275-284, vol. 32—issue 7, John Wiley & Sons Ltd.

Fattal, R. et al., Gradient domain high dynamic range compression, ACM Transactions on Graphics (TOG)—Proceedings of ACM SIGGRAPH 2002, Jul. 2002, pp. 249-256, vol. 21—issue 3, ACM, New York, NY, USA.

Ferwerda, J. et al., A high resolution, high dynamic range display for vision research, Journal of Vision, Aug. 2010, p. 346, vol. 9—issue 10, ARVO.

Ferwerda, J. A. et al., A model of visual adaptation for realistic image synthesis, Proceedings of the 23rd Annual Conference on Computer Graphics and Interactive Techniques(SIGGRAPH 1996), 1996, pp. 249-258, ACM, New York, NY, USA.

Guarnieri, G. et al., Image splitting techniques for a dual-layer high dynamic range LCD display, Journal of Electronic Imaging, Oct. 2008, pp. 1-9, vol. 17—issue 4, SPIE.

Hanhart, P. et al., Subjective Quality Evaluation of High Dynamic Range Video and Display for Future TV, International Broadcasting Convention (IBC), 2014, pp. 1-7.

Call for Evidence (CfE) for HDR and WCG Video Coding, Moving Picture Experts Group 2014 MPEG 111 Meeting (http://mpeg.chiariglione.org/meetings/111), Feb. 2015, pp. 1-46, Geneva, Switzerland.

Kim, M. H. et al., Modeling human color perception under extended luminance levels, ACM Transactions on Graphics (TOG)—Proceedings of ACM SIGGRAPH 2009, Aug. 2009, pp. 27:1-27:9, vol. 28—issue 3, ACM, New York, NY, USA.

Mantiuk, R. et al., Backward compatible high dynamic range MPEG video compression, ACM Transactions on Graphics (TOG)—Proceedings of ACM SIGGRAPH 2006, Jul. 2006, pp. 713-723, vol. 25—issue 3, ACM, New York, NY, USA.

Mantiuk, R. et al., A perceptual framework for contrast processing of high dynamic range images, ACM Transactions on Applied Perception (TAP), Jul. 2006, pp. 286-308, vol. 3—issue 3, ACM, New York, NY, USA.

Mantiuk, R. et al., Display adaptive tone mapping, ACM Transactions on Graphics (TOG)—Proceedings of ACM SIGGRAPH 2008, Aug. 2008, pp. 68:1-68:10, vol. 27—issue 3, ACM, New York, NY, USA.

Mantiuk, R. et al., HDR-VDP-2: A calibrated visual metric for visibility and quality predictions in all luminance conditions, ACM Transactions on Graphics (TOG)—Proceedings of ACM SIGGRAPH 2011, Jul. 2011, pp. 40:1-40:12, vol. 30—issue 4, ACM, New York, NY, USA.

Merkle, P. et al., Coding of depth signals for 3D video using wedgelet block segmentation with residual adaptation, 2013 IEEE International Conference on Multimedia and Expo (ICME), Jul. 2013, pp. 1-6, IEEE, San Jose, CA, USA.

Pattanaik, S. N. et al., Time-dependent visual adaptation for fast realistic image display, Proceedings of the 27th annual conference on Computer graphics and interactive techniques(SIGGRAPH 2000), 2000, pp. 47-54, ACM Press/Addison-Wesley Publishing Co., New York, NY, USA.

Reinhard, E. et al., Dynamic range reduction inspired by photoreceptor physiology, IEEE Transactions on Visualization and Computer Graphics, Jan. 2005, pp. 13-24, vol. 11—issue 1, IEEE.

Reinhard, E. et al., Photographic tone reproduction for digital images, ACM Transactions on Graphics (TOG)—Proceedings of ACM SIGGRAPH 2002, Jul. 2002, pp. 267-276, vol. 21—issue 3, ACM, New York, NY, USA.

Seetzen, H. et al., High dynamic range display systems, ACM Transactions on Graphics (TOG)—Proceedings of ACM SIGGRAPH 2004, Aug. 2004, pp. 760-768, vol. 23—issue 3, ACM, New York, NY, USA.

SIM2, Model HDR47ES4MB, http://www.sim2.com, 2015, Accessed: Oct. 28, 2015.

Touze, D. et al., High dynamic range video distribution using existing video codecs, Picture Coding Symposium (PCS) 2013, Dec. 2013, pp. 349-352, IEEE, San Jose, CA, USA.

Wanat, R. et al., Physical and perceptual limitations of a projector-based high dynamic range display, EG UK Theory and Practice of Computer Graphics 2012, 2012, pp. 9-16, The Eurographics Association, Rutherford, UK.

Wiegand, T. et al., Overview of the H.264/AVC video coding standard, IEEE Transactions on Circuits and Systems for Video Technology, Jul. 2003, pp. 560-576, vol. 13—issue 7, IEEE.

Zhang, D. et al., A low-cost, color calibrated reflective high dynamic range display, Journal of Vision, 2010, p. 397, vol. 10.

Zhang, Y. et al., Perception-based high dynamic range video compression with optimal bitdepth transformation, 2011 18th IEEE International Conference on Image Processing (ICIP), Sep. 2011, pp. 1321-1324, IEEE, Brussels.

Lukk, H., Emma, http://www.emmathemovie.com, last accessed Aug. 30, 2016.

Schriber, S. A., Lucid dreams of Gabriel, http://www.disneyresearch.com/luciddreamsofgabriel, last accessed Aug. 30, 2016.

First Office Action and Search Report in Chinese Patent Application No. 2016103772046, dated Oct. 9, 2018.

\* cited by examiner $$M_1^p \cdot \boxed{\diagup} + (1-M_1^p) \cdot \boxed{\diagup} = \boxed{\diagup} = g_1^p$$
$$M_2^p \cdot \boxed{\diagup} + (1-M_2^p) \cdot \boxed{\diagup} = \boxed{\diagup} = g_2^p$$
$$\vdots \quad \vdots \quad \vdots \quad \vdots \quad \vdots$$
$$M_n^p \cdot \boxed{\diagup} + (1-M_n^p) \cdot \boxed{\diagup} = \boxed{\diagup} = g_n^p$$
$$\circ \quad \circ \quad \circ \quad = \quad$$
$$\boxed{\diagup} \circ \boxed{\diagup} \circ \cdots \boxed{\diagup} = \boxed{\diagup}$$
$$g_1^p \circ g_2^p \circ \cdots g_n^p = g_0^p$$

FIG. 8

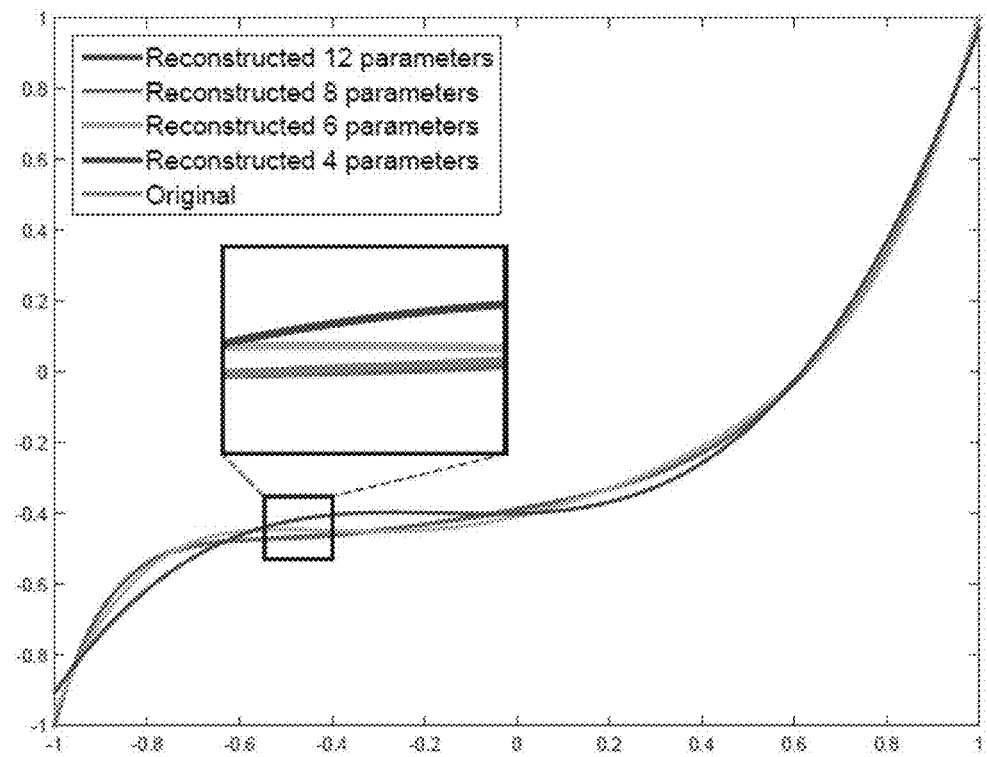
Absolute value error
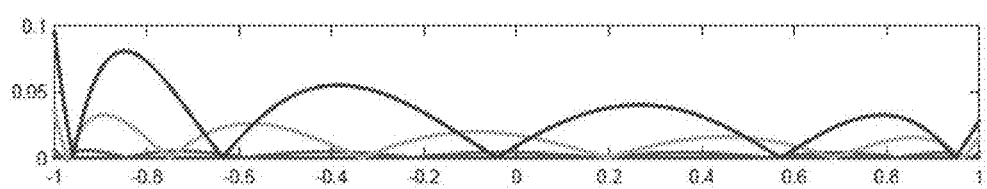
FIG. 10

METHODS FOR CREATING AND DISTRIBUTING ART-DIRECTABLE CONTINUOUS DYNAMIC RANGE VIDEO

CROSS-REFERENCE TO RELATED APPLICATIONS

This application claims the benefit of U.S. Provisional Application No. 62/169,465 filed on Jun. 1, 2015 which is incorporated herein by reference in its entirety.

TECHNICAL FIELD

The present disclosure relates generally to high dynamic range (HDR) video techniques, and more particularly, some embodiments relate to methods for creating and distributing continuous dynamic range video.

DESCRIPTION OF THE RELATED ART

A high dynamic range (HDR) is used to refer to content and displays that have a higher luminance or brightness level and/or better contrast ratio than standard dynamic range (SDR) content and displays.

BRIEF SUMMARY OF THE DISCLOSURE

According to various embodiments, systems and methods are disclosed for creating and distributing video or image content graded for a plurality of displays with different dynamic ranges. In one embodiment, creation of CDR content includes: receiving a source image and creating a continuous dynamic range image by defining a luminance of each pixel of the source image as a continuous function based on a minimum dynamic range and a maximum dynamic range. In implementations of this embodiment, creating the continuous dynamic range image further includes grading the source image for the minimum dynamic range and the maximum dynamic range. The source image may be a standalone image (e.g., a photograph) or a video frame corresponding to a video.

In embodiments, the continuous dynamic range image may be compressed by approximating each of the continuous functions using a truncated polynomial series. In particular implementations of this embodiment, the polynomial series is a Chebyshev polynomial series. In further embodiments, the polynomial coefficients of the truncated polynomial series may be represented in an image-like format.

In another embodiment of the technology disclosed herein, a graphical user interface method for creating continuous dynamic range images or video, includes: displaying on one or more displays of a computer system: a plurality of graded versions of an image, where each of the graded versions is graded for a different dynamic range display; and a control for modifying a continuous function defining the luminance of a first set of pixels of the image as a continuous function based on a minimum dynamic range and a maximum dynamic range. The method further includes receiving user input at the computer system actuating the control for modifying the continuous function; and in response to receiving the user input actuating the control for modifying the continuous function, the computer system displaying a modified version of each of the plurality of graded versions of the image on the one or more displays.

In yet another embodiment of the technology disclosed herein, a method of distributing a continuous dynamic range video comprising video frames includes the step of distributing to each of a plurality of receivers with an associated display: a minimum dynamic range grading of each of the plurality of video frames; a maximum dynamic range grading of each of the plurality of video frames; and metadata defining a luminance of each pixel of each of the plurality of video frames as an approximation of a continuous function between the minimum and the maximum dynamic range. In implementations of this embodiment, the continuous dynamic range video is transmitted as an over-the-air broadcast television signal, as a satellite television network signal, or as a cable television network signal. Alternatively, the continuous dynamic range video may be transmitted by a content server of a computer network.

In yet a further embodiment of the technology disclosed herein, a method of decoding a continuous dynamic range image for display on a display having an associated dynamic range includes the steps of: receiving an encoded continuous dynamic range image; decoding the continuous dynamic image using a codec; and creating a particular dynamic range representation of the image based on the decoded continuous dynamic range image and the dynamic range of the display. In this embodiment, the received encoded continuous dynamic range image includes: a minimum dynamic range graded version of an image; a maximum dynamic range graded version of the image; and continuous dynamic range metadata corresponding to the image.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

The present disclosure, in accordance with one or more various embodiments, is described in detail with reference to the following figures. The figures are provided for purposes of illustration only and merely depict typical or example embodiments of the disclosure.

FIG. 8 illustrates a process of obtaining a numerical lumipath in accordance with the present disclosure.

FIG. 10 illustrates an example approximation of a function by Chebyshev polynomials of different orders in accordance with the present disclosure.

Figure 1:
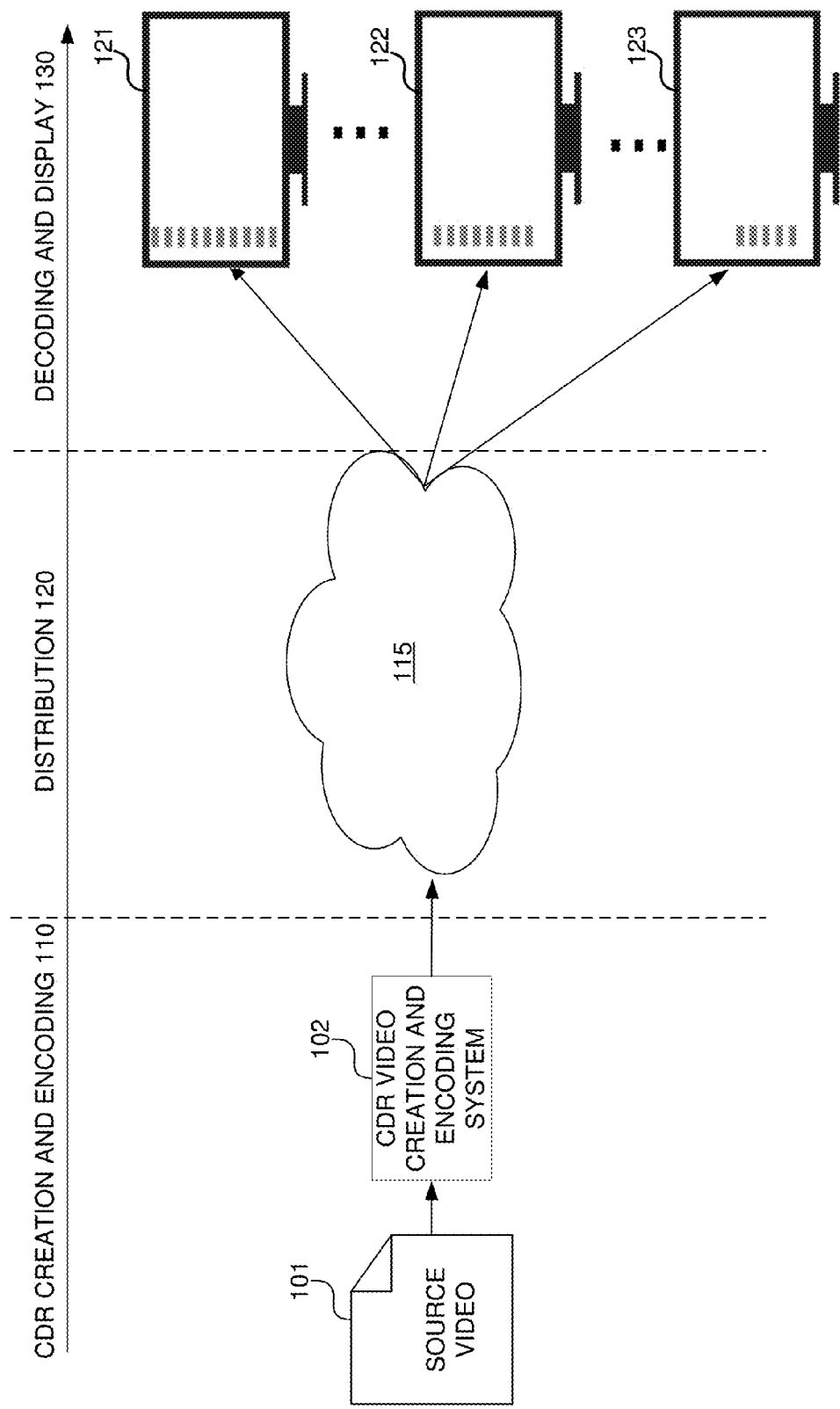
FIG. 1 illustrates an example environment in which CDR video may be created, encoded, and distributed in accordance with the present disclosure.

The figures are not exhaustive and do not limit the disclosure to the precise form disclosed.

DETAILED DESCRIPTION

The emergence of HDR displays from multiple vendors with different dynamic ranges creates some significant challenges for content production and distribution. Specifically, the production challenge is tailoring HDR content to a number of upcoming displays that are announced to have peak luminances ranging from 800-4000 nits, as well as future HDR displays with different dynamic ranges. The straightforward approach of grading content for each specific display dynamic range does not scale well due to the required additional manual labor. Methods proposed in literature, such as display adaptive tone mapping, can alleviate this issue, but do not allow for precise artistic freedom in the expression of brightness variations.

Additionally, the distribution challenge with respect to HDR content is the task of efficiently coding and transmitting a large number of HDR streams graded for different display dynamic ranges. Previous work proposed distributing a single HDR stream efficiently as a residual signal over the SDR content. This approach, however, is not efficient for application in the emerging landscape where numerous HDR streams need to be transmitted simultaneously.

In accordance with embodiments of the technology disclosed herein, novel systems and methods are disclosed for creating video or image content graded for a plurality of displays with different dynamic ranges. In embodiments, the created content is "continuous dynamic range" (CDR) content—a novel representation of pixel-luminance as a function of display dynamic range. In these embodiments, the creation of CDR content includes grading a source content for a minimum dynamic range and a maximum dynamic range, and obtaining a continuous dynamic range of the source content by defining a luminance of each pixel of an image or video frame of the source content as a continuous function between the minimum and the maximum dynamic ranges.

In this manner, content simultaneously graded for all possible display dynamic ranges may be created with little overhead. In these embodiments, a graphical user interface may be provided whereby a user specifies how the pixel luminances vary for different dynamic ranges, thereby allowing the creation of CDR video or images with full artistic control.

In further embodiments of the technology disclosed herein, methods are described for compressing, encoding, and distributing created CDR video. In these embodiments, the CDR video may be distributed as 1) a maximum dynamic range grading of the video; 2) a minimum dynamic range grading of the video; and 3) metadata defining a luminance of each pixel of each video frame as a polynomial series approximation of a continuous function between the minimum and the maximum dynamic ranges.

As used herein to describe displays, the term "dynamic range" generally refers to the display's luminance range—the range from the display's minimum luminance (i.e., "black level") and peak luminance. As would be understood by one having skill in the art, luminance may be measured using any known system of units such as SI units of candela per square meter ($cd/m^2$) or non-SI units of nits.

As further used herein, the term "lumipath" refers to a function that represents a pixel's luminance value as a function of the peak luminance of a target display.

Before describing the invention in detail, it is useful to describe an example environment in which the invention can be implemented. FIG. 1 illustrates one such example environment 100. In environment 100, source video 101 (e.g., video in raw camera format) is created and encoded (step 110) as continuous dynamic range video using CDR video creation and encoding system 102. The source video may comprise a film, a trailer, an episode from a series, a commercial, a video game cutscene, and the like.

In embodiments, further described below, a user of CDR video creation and encoding system 102 may utilize a graphical user interface (GUI) to specify how the pixel luminances of each video frame of the source video 101 vary for different dynamic ranges, thereby allowing the creation of CDR video with full artistic control over the appearance of the video for different dynamic range displays.

Following creation of the CDR video, at step 120, the CDR video is distributed to a plurality of receivers 121-123 for decoding and display (step 130). In the CDR encoded source video, the pixel-luminance of each frame is defined as a function of dynamic range. Accordingly, depending on the dynamic range of the display associated with receivers 121-123, a receiver 121-123 may decode the CDR based on the dynamic range of the receiver's display (illustrated by the rectangular pattern on the left side of the display in FIG. 1). As illustrated in particular environment 100, distribution step 120 comprises streaming or transmitting the CDR video to a plurality of television sets (e.g., smart television sets) or monitor displays 121-123 over an electronic distribution network 115. In alternative embodiments, the CDR video may be transmitted to other receivers capable of decoding and displaying the CDR video such as, for example, smartphones, laptops, tablets, workstations, and the like.

In various embodiments, the CDR video may be transmitted as an over-the-air broadcast television signal, a satellite television network signal, or a cable television network signal. Alternatively, the CDR video may be transmitted by a content server over a computer network. As would be appreciated by one having skill in the art, electronic distribution network 115 may include any combination of communication mediums, such as, for example, a coaxial cable system, a fiber optic cable system, an Ethernet cable system, a satellite communication system, a cellular communication system, and the like. In yet further embodiments, the CDR video may be distributed using physical media such as a solid state drive, magnetic tape, cartridge, a Blu-ray disc or other fixed or removable storage media known in the art that may store video.

Figure 2:
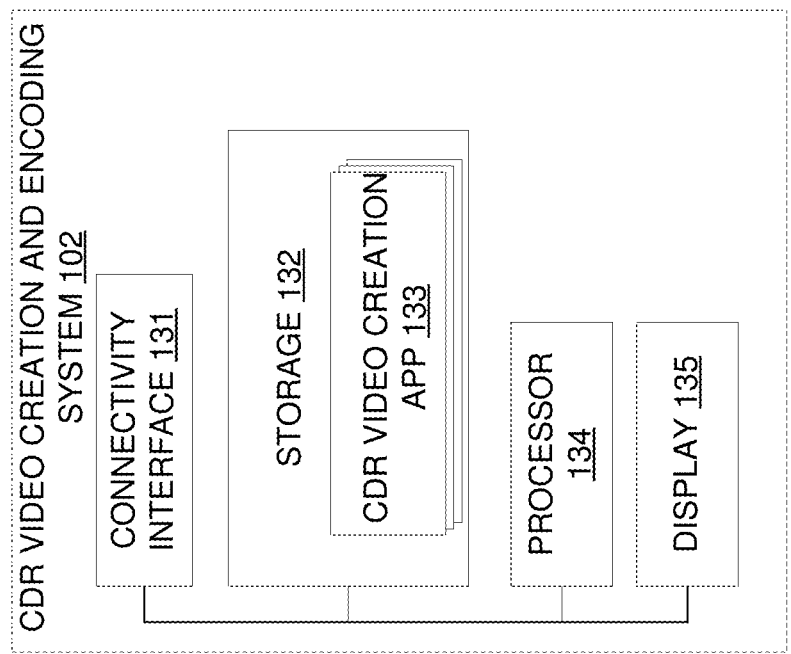
FIG. 2 illustrates an example CDR video creation and encoding system that may be implemented in the environment of FIG. 1.

FIG. 2 illustrates an example CDR video creation and encoding system 102 that may be implemented in environment 100. In various embodiments, system 102 may be any computing system (workstation, laptop, smartphone, etc.) configured to receive a source video and create a CDR video that can be tailored for a plurality of different displays having different dynamic ranges. As illustrated, system 102 includes a connectivity interface 131, storage 132 for storing a CDR video creation application 133 and source video 101, processor 134, and one or more displays 135. Connectivity interface 131 may connect system 102 to a content distribution network (e.g., network 115) using a wireless network connection such as a local area network connection, a cellular network connection, a satellite network connection, or the like. Additionally, connectivity interface may include a physical interface for transferring and receiving information such as, for example, a USB interface.

Processor 134 executes a CDR video creation application 133 that may provide a graphical user interface for an artist to customize video content for displays having different dynamic ranges. In such embodiments, the artist may specify how the pixel luminances of different regions of each video frame of source video 101 vary for different dynamic ranges. In implementations of these embodiments, further described below, display 135 displays multiple dynamic range versions of a video frame along with various user controls for controlling the pixel luminance of each video frame. In some embodiments, CDR video creation application 133 may be integrated as part of an animation application, a video editing application, an image editing application, a video game design application, or some combination thereof.

In further embodiments, processor 134 may compress and encode the created CDR video (e.g., through CDR video creation application 133) in preparation for distribution using system 102 or another distribution means.

Although example environment 100 was described with respect to the creation, encoding, and distribution of CDR video, it should be noted that in other embodiments the invention may be implemented in an environment that focuses on the creation and distribution of CDR images such as photographs, computer-generated images, and the like. As would be appreciated by one having skill in the art, environment 100 could be adapted for the creation, encoding, and distribution of CDR images.

Figure 3:
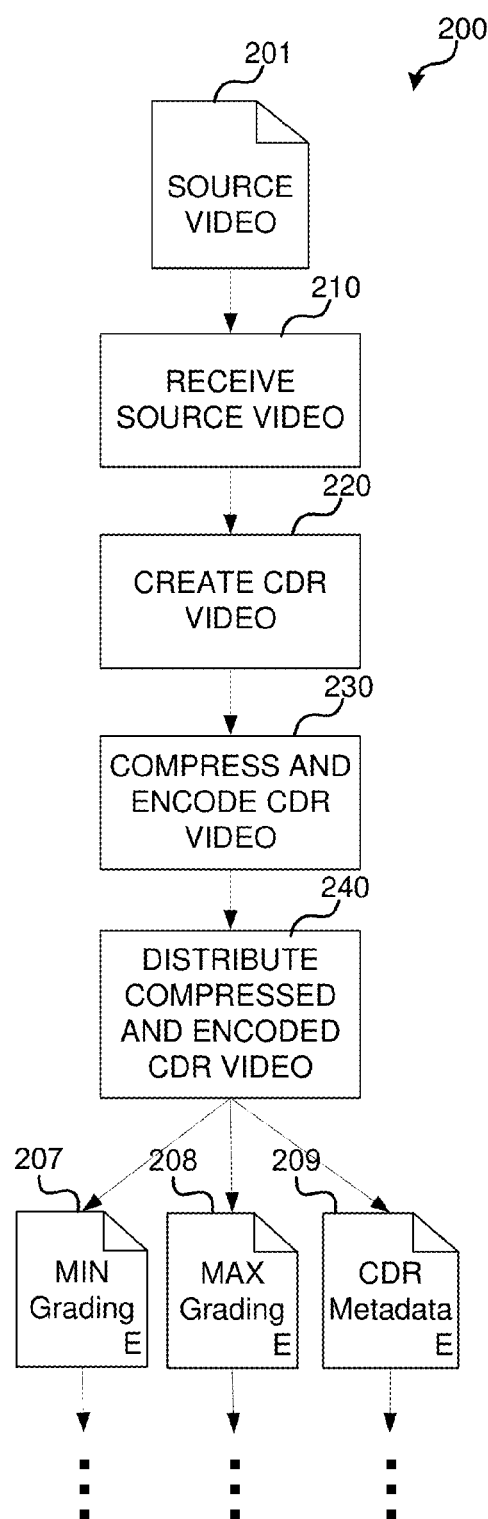
FIG. 3 is an operational flow diagram illustrating a method of creating, encoding, and distributing CDR video in accordance with an embodiment of the present disclosure.

FIG. 3 illustrates a method 200 of creating, encoding, and distributing CDR video in accordance with an embodiment of the technology disclosed herein. Method 200 takes as an input a source video 201 and outputs a CDR video that includes content simultaneously graded for all possible display dynamic ranges. The distributed CDR video includes an encoded minimum dynamic range grading of the video 207, an encoded maximum dynamic range grading of the video 208, and encoded metadata 209 that may be used by a receiving display to tailor the received CDR video to its dynamic range.

Figure 4:
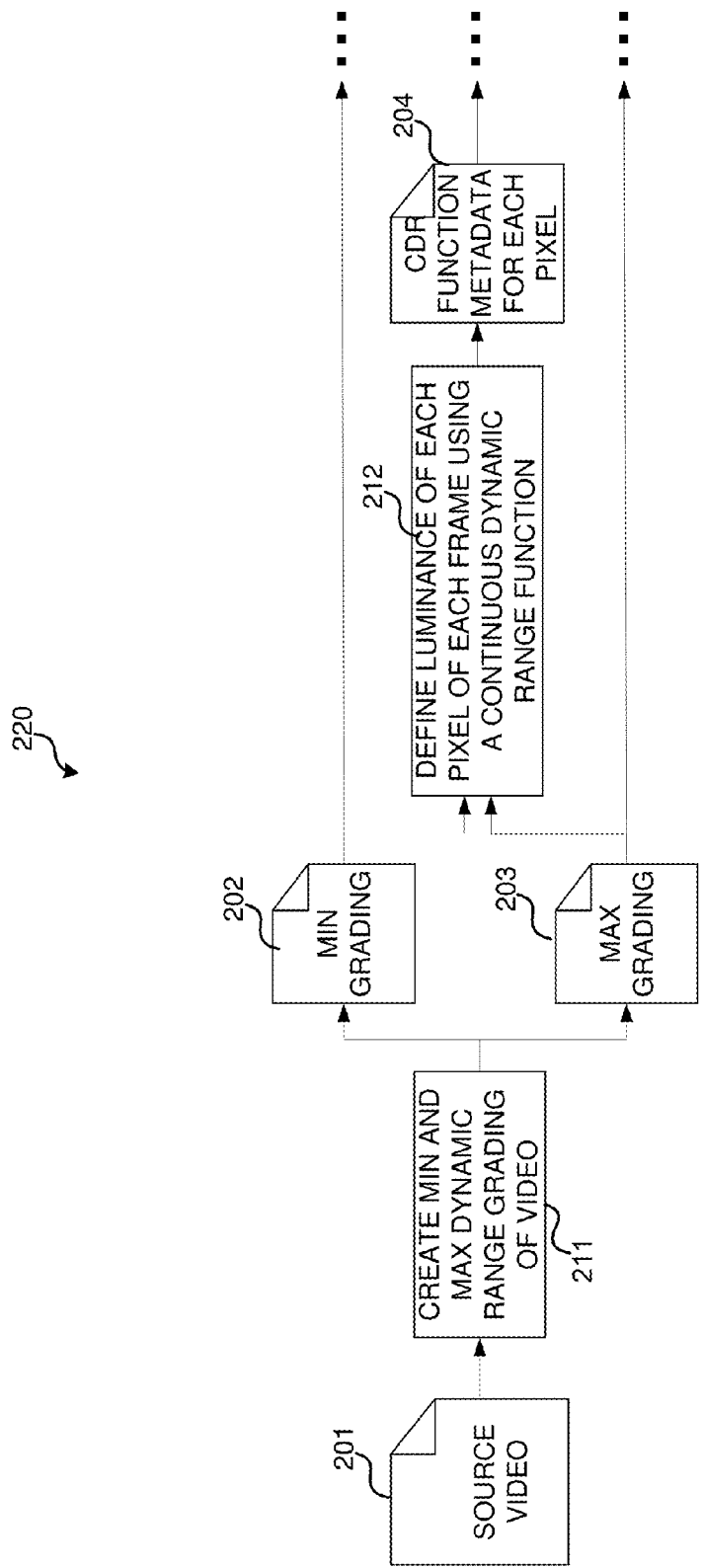
FIG. 4 is an operational flow diagram illustrating an example method of creating CDR video in accordance with the present disclosure.

Method 200 will be described in conjunction with FIGS. 4 and 9, which illustrate particular methods of creating the CDR video (220) and compressing and encoding the created CDR video (230). In various embodiments, some or all of the process operations of method 200 (e.g., CDR video creation, compression, and encoding, but not distribution) may be implemented by system 102 using CDR video creation application 133.

Method 200 begins with receiving source video 201 at operation 210. In embodiments, the received source video may be in a raw camera format (e.g., source video for a film, series episode, commercial, etc.) or a computer-generated source video (e.g., source video for an animation film, video game, and the like). For example, the source video may be received from a studio after filming a scene or from a computer graphics artist after animating a scene. In various embodiments, the dynamic range of the source video may be arbitrary. In a particular embodiment, the source video may comprise high dynamic range (HDR) content with up to 14 f-stops.

Following reception of the source video 201, at operation 220 CDR video is created. FIG. 4 illustrates one example method 220 of creating the CDR video. At operation 211 the source video content 201 is graded for minimum and maximum target dynamic ranges, thereby creating a minimum dynamic range graded content 202 and maximum dynamic range graded content 203. In embodiments, this grading process includes defining the brightness and color of the source video for the maximum and minimum dynamic range. During, before, or after this grading process, a "dynamic range hull" may be determined for the content of source video 201. As the dynamic range continuum encompassed by a CDR video is a superset of the dynamic ranges of all target displays, the dynamic range hull defines the dynamic range continuum between the minimum and maximum dynamic ranges.

Figure 5:
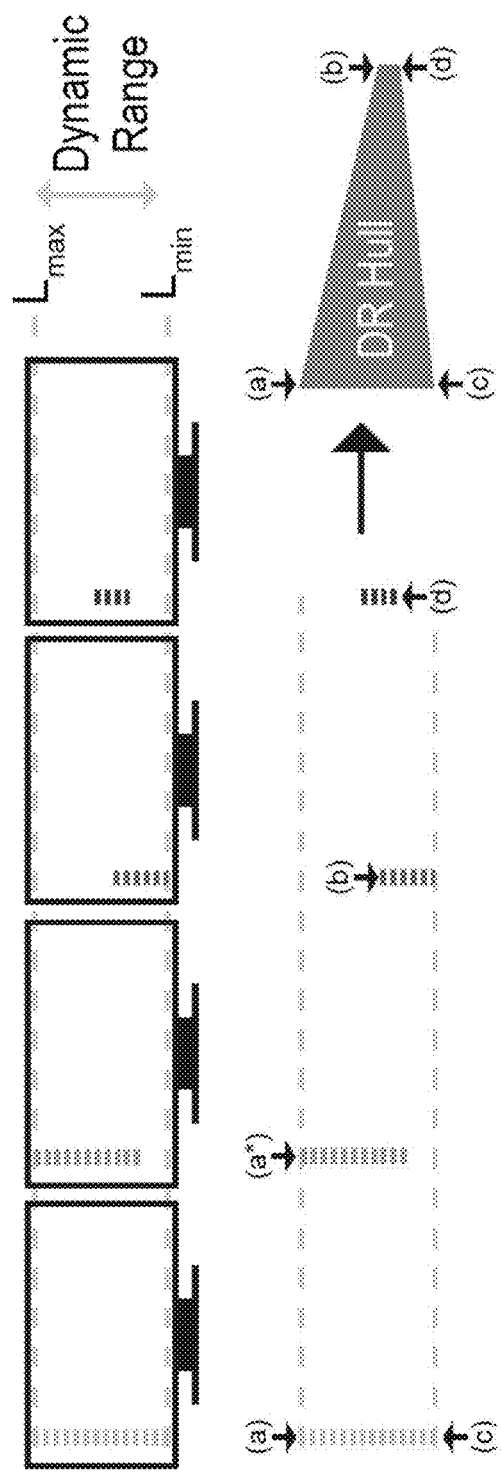
FIG. 5 illustrates a representation of a dynamic range hull in accordance with the present disclosure.

FIG. 5 illustrates a representation the dynamic range hull. As illustrated, the minimum dynamic range is bounded by the minimum peak luminance (b) and maximum black level (d) among a set of all target display dynamic ranges. Analogously, the maximum dynamic range is bounded by the max peak luminance (a) minimum black level (c) of the set of all target display dynamic ranges. In various embodiments, system 102 may determine the dynamic range hull based on parameters such as the type of content of source video 102 (e.g., cinematic film, TV episode, TV commercial, etc.), a list of known dynamic ranges of target displays, and other parameters.

For example, for a plurality of target displays consider the case where the lowest peak luminance is 100 nits, the highest peak luminance is 4000 nits, the minimum black level is 0.01 nits, and the maximum black level is 0.1 nits. In this example, the minimum dynamic range would be bounded by 0.1 nits to 100 nits, and the maximum dynamic range would be bounded by 0.01 nits to 4000 nits. Analogously, the maximum graded content would be targeted for a display with peak luminance of 4000 nits and a black level of 0.01 nits, and the minimum graded content would be targeted for a display with a peak luminance of 100 nits and a black level of 0.1 nits.

Subsequently, at operation 212 a CDR video may be created by defining a luminance of each pixel of each frame of the source video as a continuous function based on the minimum and maximum dynamic range gradings 202, 203. In these embodiments, the CDR video may store a dynamic range function for each pixel as contrasted with conventional methods that store a scalar luminance value for each pixel. In particular embodiments, a "lumipath", a function that represents a pixel's luminance value as a function of the peak luminance of a target display, may be used and stored at each pixel.

Figure 6:
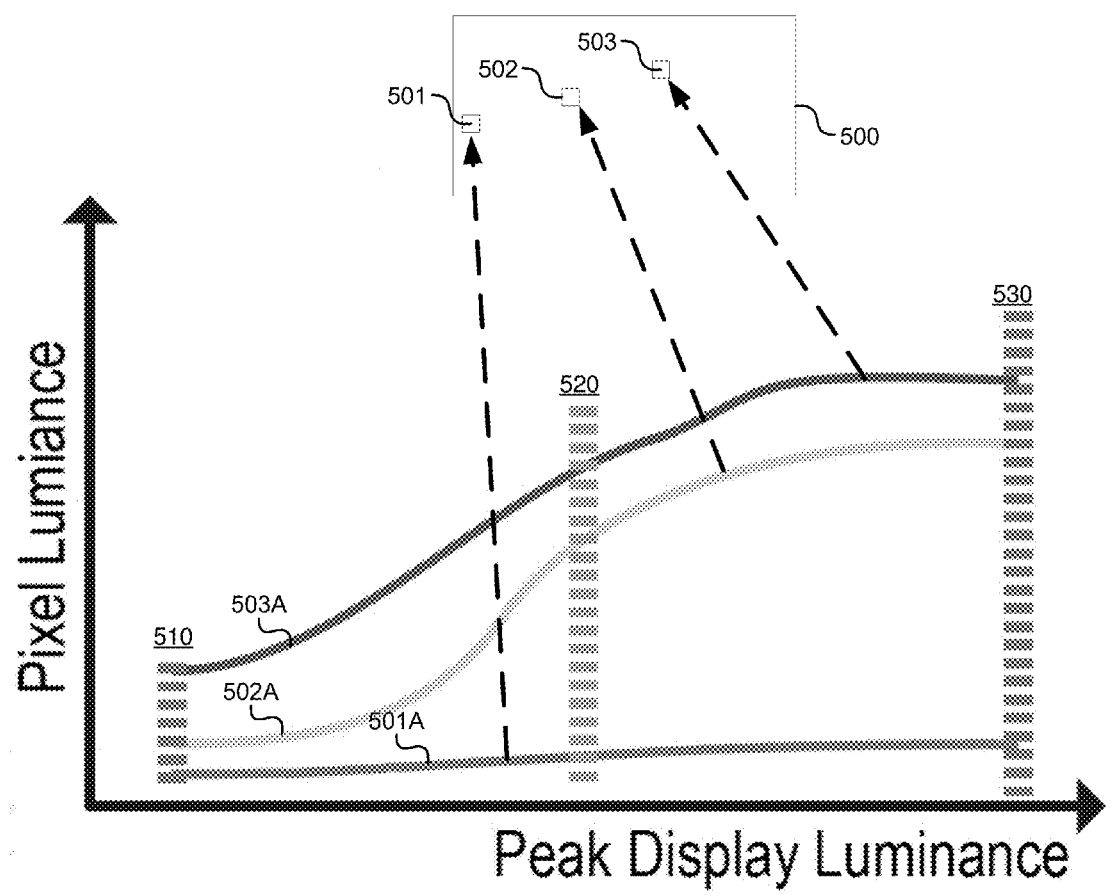
FIG. 6 illustrates an example implementation of lumipaths for a video frame in accordance with the present disclosure.

FIG. 6 illustrates an example implementation of lumipaths for a video frame 500 including pixels 501-503. As shown, each pixel 501-503 of video frame 500 has an associated lumipath function 501A-503A that defines the luminance of the pixel based on the peak display luminance of a target display. In this example implementation, minimum dynamic range 510 and maximum dynamic range 530 bound the lumipath functions 501A-503A. Dynamic range 520 corresponds to an intermediate dynamic range display. For pixel 501, the pixel luminance does not significantly increase as the peak display luminance increases, indicating a darker area of video frame 500. By contrast, for pixels 502 and 503 the pixel luminance dramatically increases around the center of peak display luminances, and levels off thereafter. As would be appreciated by one having skill in the art, in various embodiments the shape of lumipath functions 501A-503A may be varied to tailor the appearance of the video content for different displays.

Figure 7A:
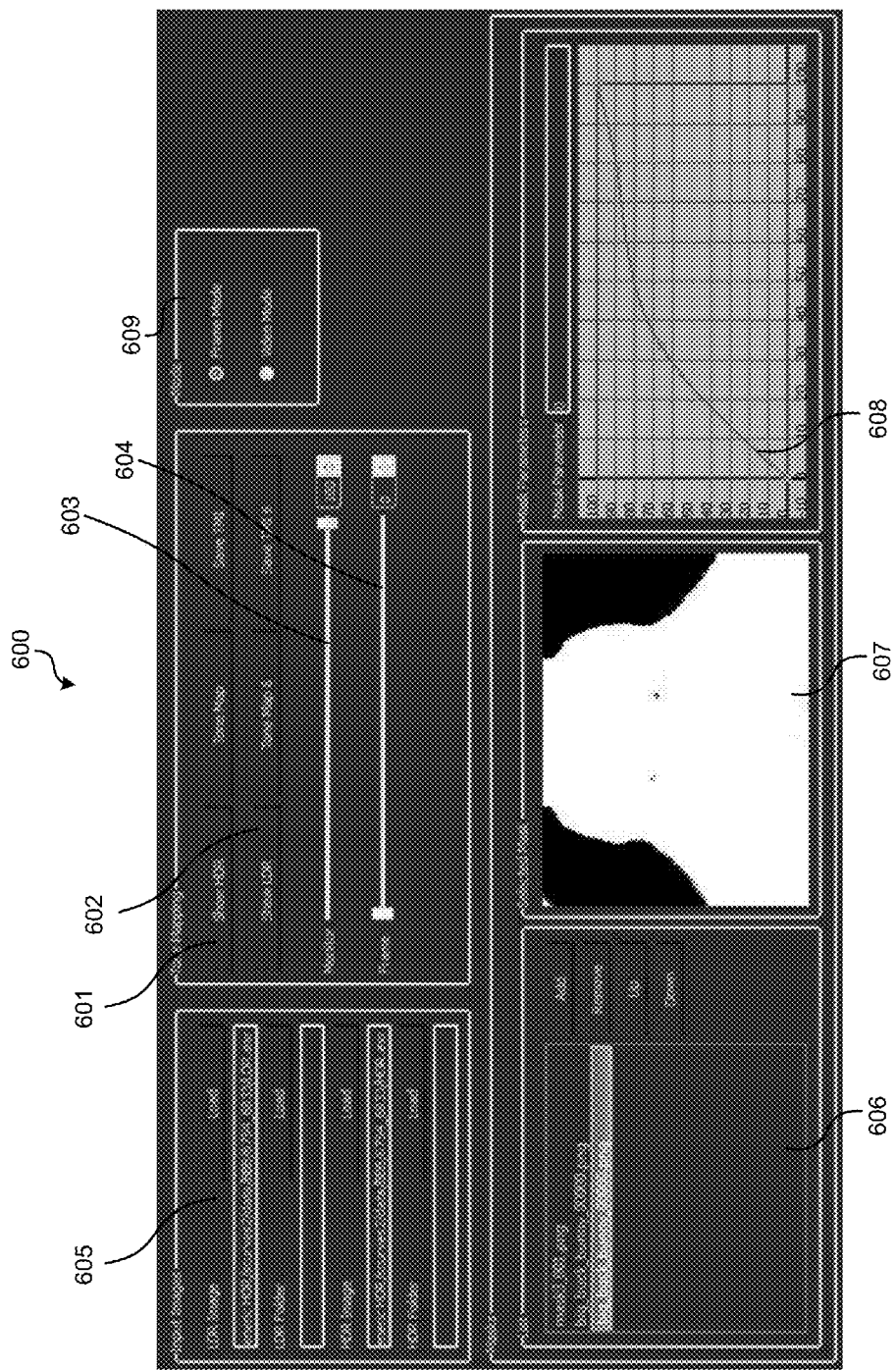
FIG. 7A illustrates an example video editing interface that may be used by an artist to create CDR video in accordance with the present disclosure.
Figure 7B:
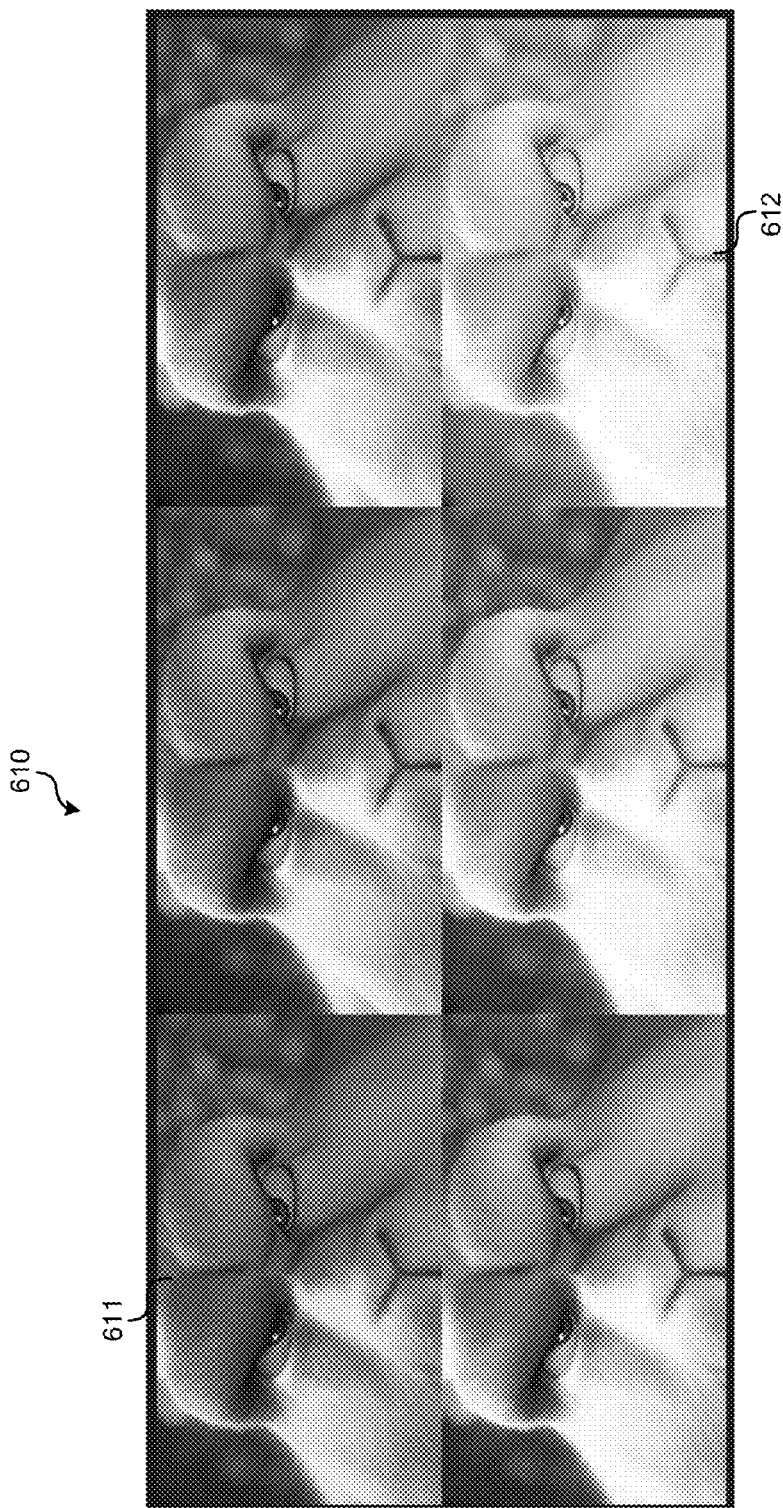
FIG. 7B illustrates an example video editing interface that may be used by an artist to create CDR video in accordance with the present disclosure.

In embodiments, the lumipaths for each pixel may be user-defined using an interactive video editing interface provided by CDR video creation application 133. FIGS. 7A-7B illustrate one particular implementation of a video editing interface that may be used by a user of system 102 to define the lumipaths of each pixel of each video frame. As illustrated in this particular embodiment, a first SDR display (illustrated by FIG. 7A) provides an interface 600 including controls (e.g., buttons, toggles, sliders, navigational components, etc.) for defining the lumipaths for different video frames for different display dynamic ranges. A second HDR display (illustrated by FIG. 7B) provides an interface 610 that allows users to visualize their edits for a plurality of dynamic ranges in an interactive manner. It should be noted that although separate displays are illustrated for defining the lumipaths and displaying the edits for a plurality of dynamic ranges, in alternative embodiments a single display (e.g., a large HDR display) may be used to perform both functions.

Interface 600 include controls 605 for loading graded videos into the system (e.g., by selecting folders) for beginning a grading session. As illustrated in this embodiment, the system is loaded with gradings for the extremes of the dynamic range hull, i.e., the minimum graded video and the maximum graded video. Additionally, interface 600 includes button control 601 for selecting a highest graded video or video frame (601), button control 602 for selecting a lowest graded video or video frame 602, slider control 603 for selecting a particular display with an associated dynamic range, and slider control 604 for selecting a particular video frame.

Interface 610 provides a tiled interface for visualizing continuous dynamic range video over several dynamic ranges. In this example embodiment, six different windows allow the user to visualize what the video or video frame will look like over six different dynamic range displays. By selecting a frame mode or video mode provided by control 609, a user may visualize what a particular frame or video segment will look like. In this implementation, the dynamic ranges are shown in ascending order from top left to bottom right, with the top left window 611 showing minimum dynamic range grading and the bottom right window 612 showing the maximum dynamic grading. Alternatively, in other implementations any number of windows and any dynamic range display order may be used.

In embodiments illustrated by interface 600, cascaded masks may allow a user of application 133 to define a magnitude of edits in each video frame. As shown, a mask interface may provide controls 606 for selecting a particular mask, a display 607 of the selected mask, and controls 608 for modifying a lumipath function corresponding to the selected mask. In implementations, the masks may be applied to contrasting regions of a video frame, a specific region of the video frame, or the entire video frame.

For example, consider the scene illustrated in FIG. 7B. A first global mask may generate an even masking for every pixel of the scene including the animated character's face and the background environment. Once a user is satisfied with the global mask, another mask (e.g., mask 607) may be applied to separate all or a portion of the character's face from the rest of the scene, allowing for precise local control. For example, the character's face may be made brighter or darker relative to the environment across the entire dynamic range hull. Alternatively, a user my choose to adjust the appearance of the animated character's face for a particular dynamic range (e.g., one or two target displays) as opposed to the entire dynamic range. As would be appreciated by one having skill in the art considering the above-described examples, the masks may be used to change highlights or shadows of different video frames across different dynamic ranges.

As shown in the particular implementation of interface 600, a third degree polynomial spline interface control 608 allows a user to manually input and modify lumipaths by changing the shape of the displayed lumipath function (e.g., by selecting control points on the curve and dragging the mouse). However, in other implementations other suitable interfaces (e.g., higher degree polynomial spline interfaces) known in the art for defining and modifying continuous functions may be provided. It should also be noted that although the particular example of FIGS. 7A-7B is described with respect to using lumipath functions to define a pixel's luminance across the dynamic range hull, in other embodiments other suitable continuous functions may be used for defining a pixel's luminance based on the minimum and maximum dynamic range gradings. It should also be noted that in alternative implementations lumipath functions may be predefined and used to generate CDR video based on a minimum and maximum grading without relying on any user interaction.

In embodiments, functions that define the luminance of each pixel of each frame, for example lumipaths, may be mathematically defined as follows. First, the minimum and maximum gradings 202, 203 may be denoted as $I_\alpha$ and $I_\beta$, respectively. The minimum and peak luminances of $I_\alpha$ are denoted as $\eta_\alpha$ and $\pi_\alpha$, respectively, and the minimum and peak luminance of $I_\beta$ are denoted as $\eta_\beta$ and $\pi_\beta$, respectively. Functions that specify how the pixel luminances change across a dynamic range hull may be defined by Equation (1):

$$h^p:[\eta_\alpha,\eta_\beta]\times[\pi_\alpha,\pi_\beta]\to[\mathcal{L}(I_\alpha^p),\mathcal{L}(I_\beta^p)] \qquad (1)$$

Which associates with each pixel p and dynamic range $(\eta,\pi)$ a unique luminance value $h^p(\eta,\pi)$, where $\mathcal{L}(I_\alpha^p)$ is the luminance of a pixel p for the minimum grading, and $\mathcal{L}(I_\beta^p)$ is the luminance of a pixel p for the maximum grading. Accordingly, Equation (1) maps the luminance of a pixel in any target dynamic range of the dynamic range hull to a value that is in between the actual pixel luminance values in the minimum and maximum gradings.

To reduce the computational complexity of generating these functions and the amount of distributed data, the domain may be restricted to $[\pi_\alpha,\pi_\beta]$, and the associated minimum luminance for any $\pi\in[\pi_\alpha,\pi_\beta]$ may be defined by Equation (2):

$$\eta(\pi) = \eta_\alpha + (\eta_\beta - \eta_\alpha)\frac{\pi - \pi_\alpha}{\pi_\beta - \pi_\alpha} \qquad (2)$$

Following Equation (2), the considered dynamic range hull may be defined by $(\eta(\pi),\pi)$ $\forall \pi\in[\pi_\alpha,\pi_\beta]$. Consequently, a lumipath, which represents a pixel's luminance value as a function of the peak luminance pi of a target display, may be defined by Equation (3):

$$g^p:[\pi_\alpha,\pi_\beta]\to[\mathcal{L}(I_\alpha^p),\mathcal{L}(I_\beta^p)] \qquad (3)$$

Where $\pi_\alpha$ and $\pi_\beta$ are the peak luminances corresponding to the maximum and minimum dynamic ranges.

As noted in the example of FIGS. 6A-6B, users may select desired image regions by using masks and adjusting the lumipaths by modifying control points of a third degree polynomial spline interface. More generally, the user's use of masks to define the lumipaths may be mathematically defined as follows. Formally, given a series of image masks $M_j$ with values $M_j^p \in [0, 1]$, the user may manually specify functions $k_j:[\pi_\alpha,\pi_\beta] \to [\pi_\alpha,\pi_\beta]$ with the user interface. When applied to each pixel, the function is modulated at each pixel position by the mask, and $k_j^p$ is obtained as shown in Equation (4):

$$k_j^p(\pi) = M_j^p k_j(\pi) + (1-M_j^p)\pi \qquad (4)$$

Equation (4) defines a blending between the artist's defined curve and a linear curve based on the weights specified by the mask, allowing for smoothly varying edits. Accordingly, by employing n masks and specifying n such functions, the corresponding lumipaths $g^p$ may be obtained by applying all functions successively (layer based grading) and scaling the result as shown by Equation (5):

$$g^p = \frac{k_1^p \circ \cdots \circ k_n^p - \pi_\alpha}{\pi_\beta - \pi_\alpha}(\mathcal{L}(I_\beta^p) - \mathcal{L}(I_\alpha^p)) + \mathcal{L}(I_\alpha^p) \qquad (5)$$

Where the lumipath $g^p:[\pi_\alpha,\pi_\beta] \to [\mathcal{L}(I_\alpha^p), \mathcal{L}(I_\beta^p)]$ is the desired curve defining the luminance of the pixel p for any display with maximum brightness between the two analyzed extremes. FIG. 8 illustrates this process of obtaining a numerical lumipath as defined by equations (4) and (5). As shown, lumipaths input by an artists are averaged with linear functions according to the weights specified in the user interface and subsequently concatenated to obtain the final per-pixel lumipath $g^p$.

As would be appreciated by one having skill in the art, as there are no restrictions in how the input gradings of the video frames are obtained, any number of pixel-level masks for region selection can be used as long as spatial correspondence of the pixels is conserved. Additionally, the lumipaths or other functions may be defined precisely using any number of control points, thereby allowing significant artistic freedom during operation 220.

Following creation of CDR video at operation 220, the CDR video in its raw format is represented for each frame f by (1) a minimum dynamic range graded image (e.g., $I_\alpha^f$); 2) a maximum dynamic range graded image (e.g., $I_\beta^f$); and 3) metadata including a continuous dynamic range function (e.g., lumipaths $g^{p,f}$) for every pixel of the frame. In embodiments, the raw format of this data make occupy a considerable amount of data. Accordingly, at operation 230 of method 200 the CDR video may be compressed and encoded in preparation for distribution.

Figure 9:
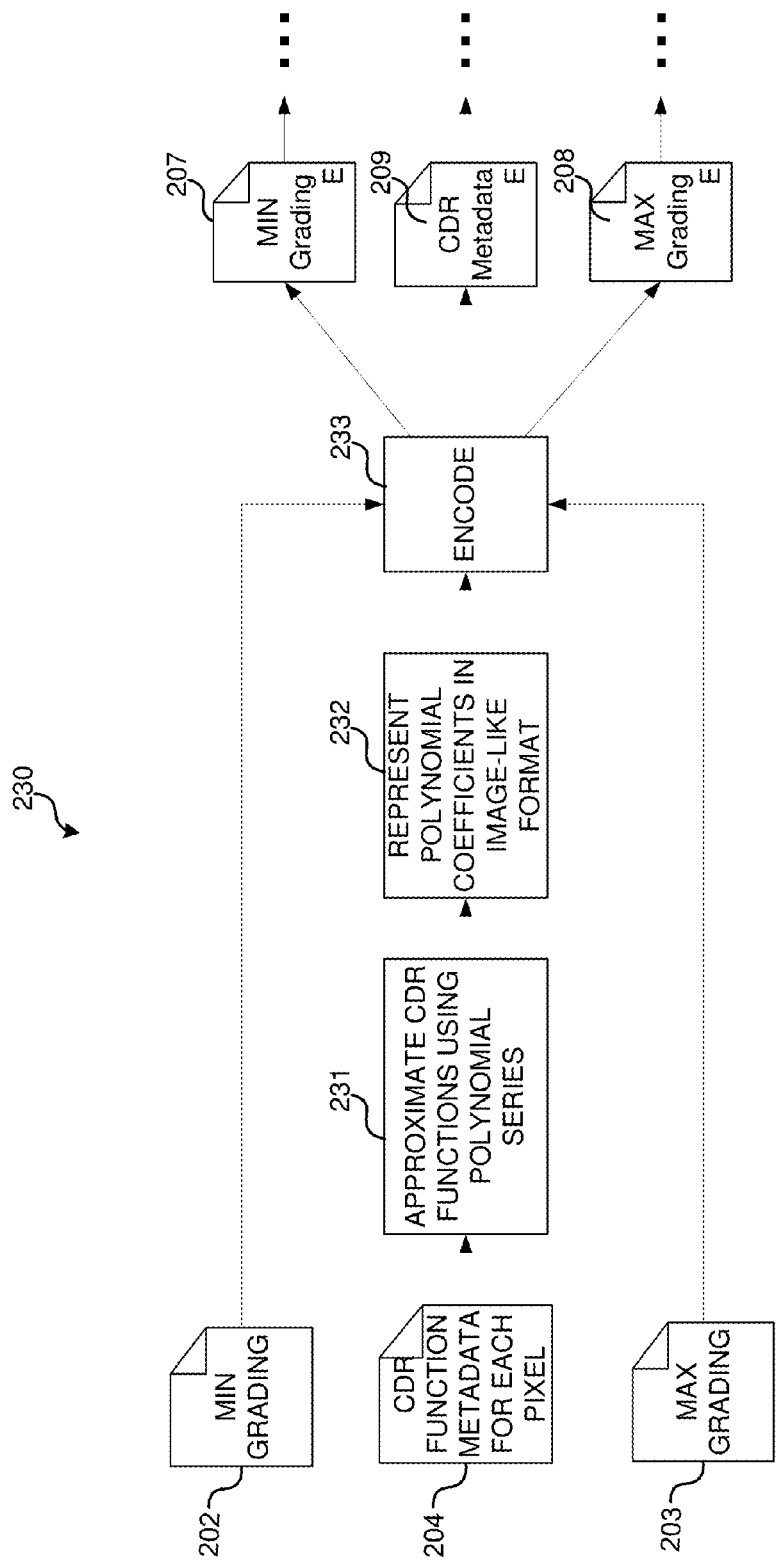
FIG. 9 is an operational flow diagram illustrating an example method of compressing and encoding CDR video in preparation for distribution in accordance with the present disclosure.

FIG. 9 illustrates one example method 230 of compressing and encoding the CDR video in preparation for distribution. As further described below, method 230 may be used in embodiments to provide a representation of the CDR functions for each pixel that is both data efficient and visually lossless as compared to the original CDR video.

Method 230 begins at operation 231, where the CDR functions corresponding to each pixel are approximated using a polynomial series that is truncated after a certain number of coefficients. Accordingly, the resulting representation of each CDR function is a finite set of coefficients (i.e., vector of coefficients) with respect to a polynomial basis. In preferred embodiments, the polynomial series is truncated at a point where the resulting output is visually lossless based on a human visual system model.

In embodiments further described below, the polynomial series is a truncated Chebyshev series. In these embodiments, the use of Chebyshev polynomials may be desirable because i) they minimize Runge's phenomenon when approximating in an interval, which is important since in practice most displays are located near the minimum end of the examined dynamic range hulls; ii) they can be quickly computed numerically; and iii) the error of the approximated function as compared to the original may be easily estimated from the coefficients, thereby providing a stopping point. However, other suitable polynomial series known in the art may be used.

Following approximation of the CDR functions using a finite set of coefficients with a polynomial basis, at operation 232 the polynomial coefficients are represented in an image format, which allows application of a video codec to the data. For example, in one embodiment the polynomial coefficients may be reorganized into monochrome video sequences. In embodiments, the representation of the polynomial coefficients in an image format may depend on the video codec (e.g, MPEG-4, H.264, etc.) that is subsequently used to encode the data.

Thereafter, at operation 233 the coefficient images (i.e., image data formatted polynomial coefficients) may be encoded using a corresponding video codec such as MPEG-4 or H.264, thus providing additional compression and improving data bitrates. Additionally, at operation 233 minimum dynamic range graded content 202 and maximum dynamic range graded content 203 may be compressed and encoded using video codecs known in the art for compressing LDR and HDR content (e.g., MPEG format). In embodiments, content 202 and 203 may be jointly and dependently encoded by making use of inter-redundancies between the two signals. For example, in particular embodiments the two contents may be encoded as base and enhancement layers using scalable video coding (SVC) methods known in the art. Alternatively, in other embodiments minimum dynamic range graded content 202 and maximum dynamic range graded content 203 may be encoded separately (e.g. using H.264).

In embodiments, a mathematical implementation of method 230 using the aforementioned lumipaths $g^{p,f}$ may proceed as follows. The human visual system may be modeled using a threshold-versus-intensity (tvi) function that computes an approximate threshold luminance, given a level of luminance adaptation $L_a$. The tvi function may be computed by finding the peak contrast sensitivity at each luminance level as shown by Equation (6):

$$tvi(L_a^p) = \frac{L_a^p}{\max_x (CSF(x, L_a^p))} \qquad (6)$$

Where CSF is the contrast sensitivity function, and $L_a^p$ is the adaptation luminance for a pixel p. In this implementation it is assumed that the human eye can adapt perfectly to a single pixel p.

Given a lumipath $g^{p,f}$, it may be approximated at a given pixel in a perceptually lossless way by a truncated Chebyshev series $\overline{g}^{p,f}$ if $\|g^{p,f} - \overline{g}^{p,f}\|_\infty < tvi(L_a^p)$ is satisfied, i.e. the deviation is smaller than the threshold computed by the model of the human visual system. The truncated Chebyshev series may be represented by Equation (7):

$$\bar{g}^{p,f}(x) = \sum_{k=0}^{N_{p,f}} c_k^{p,f} \psi_k(x) \qquad (7)$$

Where $\psi_k(x)$ is the k-th Chebyshev polynomial, $c_k^{p,f}$ is the corresponding Chebyshev coefficient at pixel p of frame f, and $N_{p,f}$ is the smallest degreed required to obtain an error $\|g^{p,f}-\bar{g}^{p,f}\|_\infty$ which is smaller than $tvi(L_a^p)$. This defines a perceptually lossless approximation of $g^{p,f}$ which is determined by $N_{p,f}+1$ coefficients $c_0^p, \ldots, c_{N_{p,f}}^{p,f}$.

For computing the Chebyshev series, the domain and range of all lumipaths is scaled such that they all lie in the Chebyshev domain $g^{p,f}: [-1,1] \to [-1,1]$. Because each basis polynomial $\psi_k(x)$ has a domain $\mathcal{D}:=[-1,1]$ and its range $\psi_k(\mathcal{D})$ is also a subset of $[-1,1]$, the total $\|g^p-\bar{g}^p\|_\infty$ error of the approximation is bounded by the sum of the absolute values of the infinite remaining coefficients of the series. In embodiments, a stopping criterion for the coefficients may be given by the sum of the absolute value of a small number of elements. For example, the series may be truncated when the absolute sum of the next three elements is below an allowed error threshold. An example of an approximation of a function by Chebyshev polynomials of different orders is illustrated by FIG. 10. The absolute value of the error between the original function and the reconstructed representation is shown in the bottom scale of FIG. 10.

Following determination of the Chebyshev coefficients $(c_0^p, \ldots, c_{N_{p,f}}^{p,f})$ for an approximated but visually lossless representation of lumipath $\bar{g}^{p,f}$, the coefficients may be quantized and reorganized into monochrome video sequences. The maximum degree of $N := \max_{p,f} N_{p,f}$ and set $c_k^{p,f}:=0$ for $k > N_{p,f}$ may be computed, which leads to a representation $\bar{g}^{p,f}(x) = \Sigma_{k=0}^N c_k^{p,f} \psi_k(x)$ of the function described in Equation (7), but with a fixed parameter N. Each lumipath $\bar{g}^{p,f}$ is now specified by an N-tuple of Equation (8):

$$c^{p,f}:=(c_1^{p,f}, \ldots, c_N^{p,f}) \qquad (8)$$

To obtain an image-like representation, the tuples $c^{p,f}$ of all pixels of a frame are represented by coefficient matrices $C_k^f \in \mathbb{R}^{h \times w}$ for $1 \leq k \leq N$ which by construction have the same pixel resolution hxw as $I_\alpha^f$ and $I_\beta^f$. All entries of all matrices $C_k^f$ may then be uniformly quantized to a particular bit depth to obtain N matrices $\bar{C}_k^f$. In embodiments, the bit depth may be selected depending on the maximum bit depth for images which are supported by the video codec used for compression. For example, in this example implementation the entries of all matrices may be quantized to 8-bit integers because it corresponds to the maximum bit depth for images which are supported for compression by the main profile of H.264.

Figure 11:
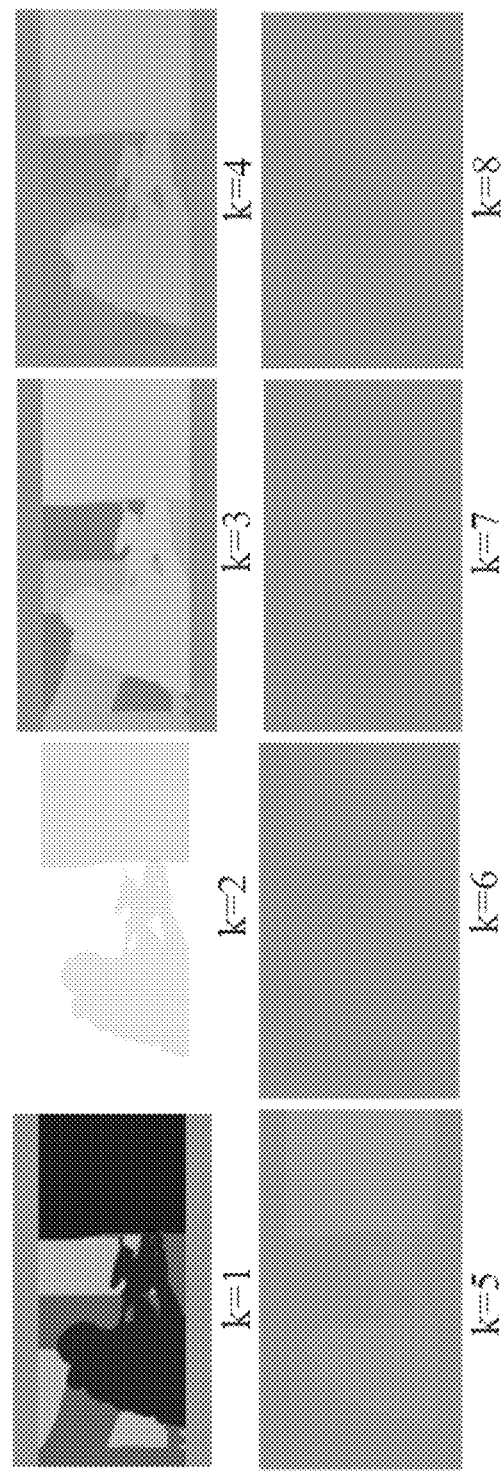
FIG. 11 illustrates the first eight coefficient images of a frame of a video sequence in accordance with example embodiment of the present disclosure.

FIG. 11 illustrates the first eight coefficient images $\bar{C}_k^1$ of a frame of a video sequence. As illustrated, most of the information is concentrated within the first few coefficients. The energy and variance in the coefficient images drops rapidly with increasing coefficient index. Moreover, coefficients may have uniform values over large image regions. Accordingly, the information content of coefficient images and videos may generally be relatively limited in practice as compared to the images and videos themselves, making them very compressible.

Thereafter a compressed representation of the lumipaths may be obtained by storing: 1) an integer value representing the degree N, 2) two floating point-values representing the minimum and maximum value used for bit depth (e.g., 8-bit) quantization, and 3) an encoded representation of the image sequences $\bar{C}_k^1, \ldots, \bar{C}_k^F$ for $k=1, \ldots, N$ which is obtained by encoding the coefficient images using the video codec (e.g., H.264).

Following video compression and encoding of the CDR video at operation 230, the output content includes encoded minimum dynamic range graded content 207, encoded maximum dynamic range graded content 208, and encoded CDR video metadata 209. Referring back to FIG. 3, this content may subsequently be distributed at operation 240. In embodiments, the CDR video content may be distributed as an over-the-air broadcast television signal, a satellite television network signal, or a cable television network signal. Alternatively, the CDR video content may be transmitted by a content server over a computer network. In yet further embodiments, the CDR video content may be distributed using physical media such as a solid state drive, magnetic tape, cartridge, a Blu-ray disc, etc.

Figure 12:
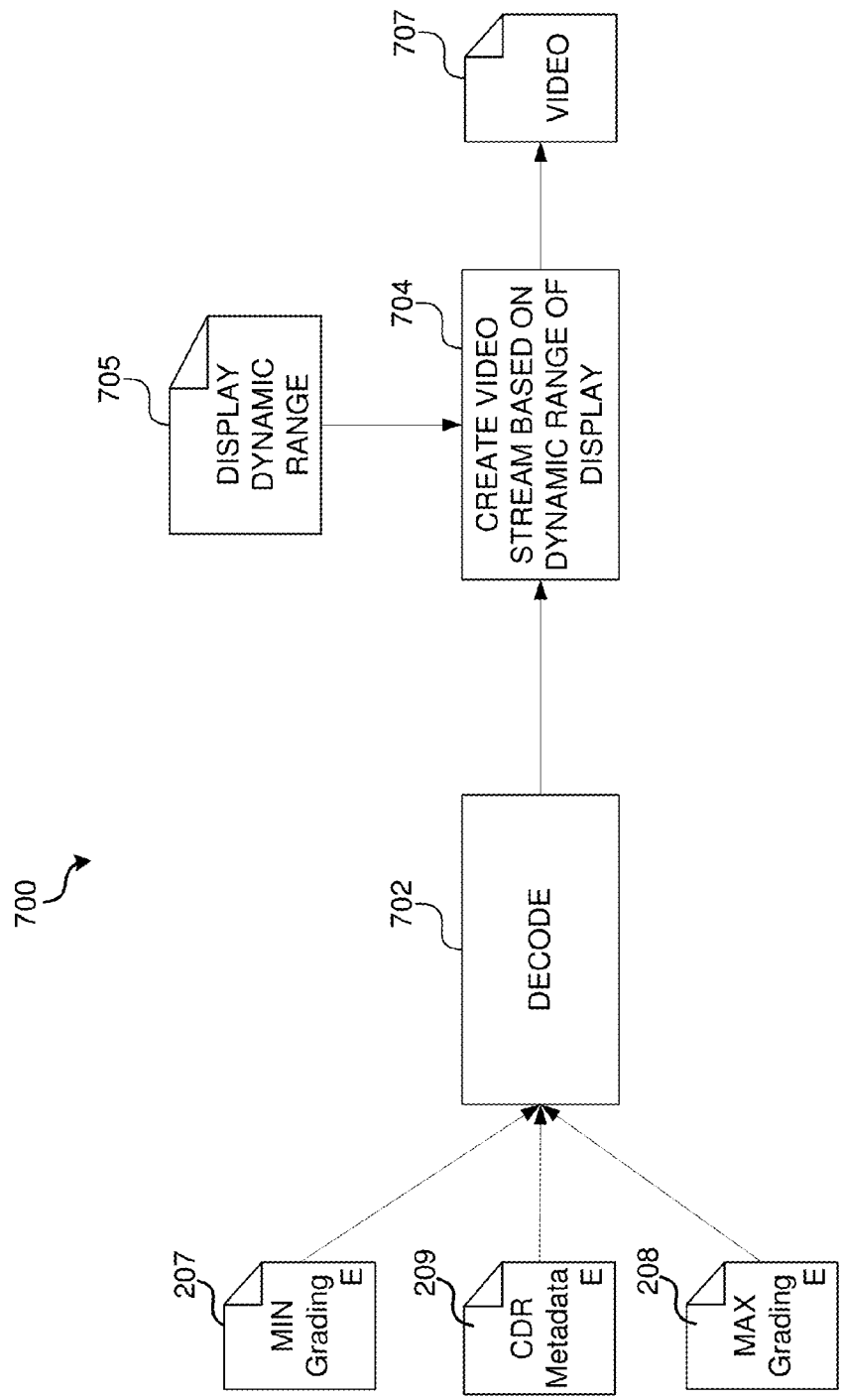
FIG. 12 is an operational flow diagram illustrating a receiver side method for decoding and displaying a received CDR video content stream in accordance with the present disclosure.

FIG. 12 illustrates a receiver side method 700 for decoding and displaying received CDR video content. As illustrated, the received CDR content may include the video encoded minimum dynamic range graded content 207, maximum dynamic range graded content 208, and CDR video metadata 209. Although illustrated as having separate reference numbers in example FIG. 12, it should be noted that the received maximum dynamic range graded content and minimum dynamic range graded may arrive jointly encoded (e.g., as a base layer and enhancement layer based on SVC techniques).

At operation 702, the received content is decoded using a suitable video compression codec (e.g., H.264, MPEG-4, etc.). For example, in particular embodiments where the minimum graded content and maximum graded content were jointly encoded as base and enhancement layers using a SVC codec, the content may be decoded using the SVC codec. Alternatively, in other embodiments minimum dynamic range graded content 202 and maximum dynamic range graded content 203 may be decoded separately (e.g. using H.264). In one embodiment, CDR video metadata 209 may be decoded using the same codec used to decode content 207 and 208.

Subsequently, at operation 704 the receiver creates a suitable dynamic range representation of the video 707 based on the decoded content and a known dynamic range 705 of the display that will display the content. As would be appreciated by one having skill in the art, the receiver may reconstruct a lumipath for each pixel based on the polynomial vector of coefficients and knowledge of the algorithms used to create the CDR metadata, such as the polynomial series used to represent the lumipath functions for each pixel of each frame. Thereafter, given the decoded maximum and minimum graded images, the decoded and reconstructed lumipaths for each pixel of the image, and the display dynamic range 705, a corresponding lumipath may be evaluated for each pixel of each image to define the luminance of that pixel for the display, thereby a obtaining a suitable dynamic range representation of the video 707.

Although methods described herein have been primarily described with reference to the creation, compression, distribution, and receipt of CDR video, one having skill in the art would appreciate that they may equally apply to the creation of CDR images such as CDR photographs or computer-generated graphics. For example, in various embodiments a CDR image may be created by grading a source image for maximum and minimum dynamic ranges, and defining a luminance of each pixel of the image as a continuous function based on the minimum and maximum dynamic range gradings. As another example, the graphical user interface of FIGS. 7A-7B could be adapted for the creation of CDR images by allowing an artist to simultaneously display and modify a plurality of dynamic range graded versions of a particular image (e.g., by adding a new mode 609 for images or using the existing frame mode).

Similarly, in various embodiments the CDR image may be compressed by approximating the CDR functions corresponding to each pixel of the image using a polynomial series that is truncated after a certain number of coefficients. Additionally, the compressed CDR image may be encoded using a suitable codec. Furthermore, the encoded CDR image may be distributed to a receiver that decodes and displays the image using a suitable codec.

Figure 13:
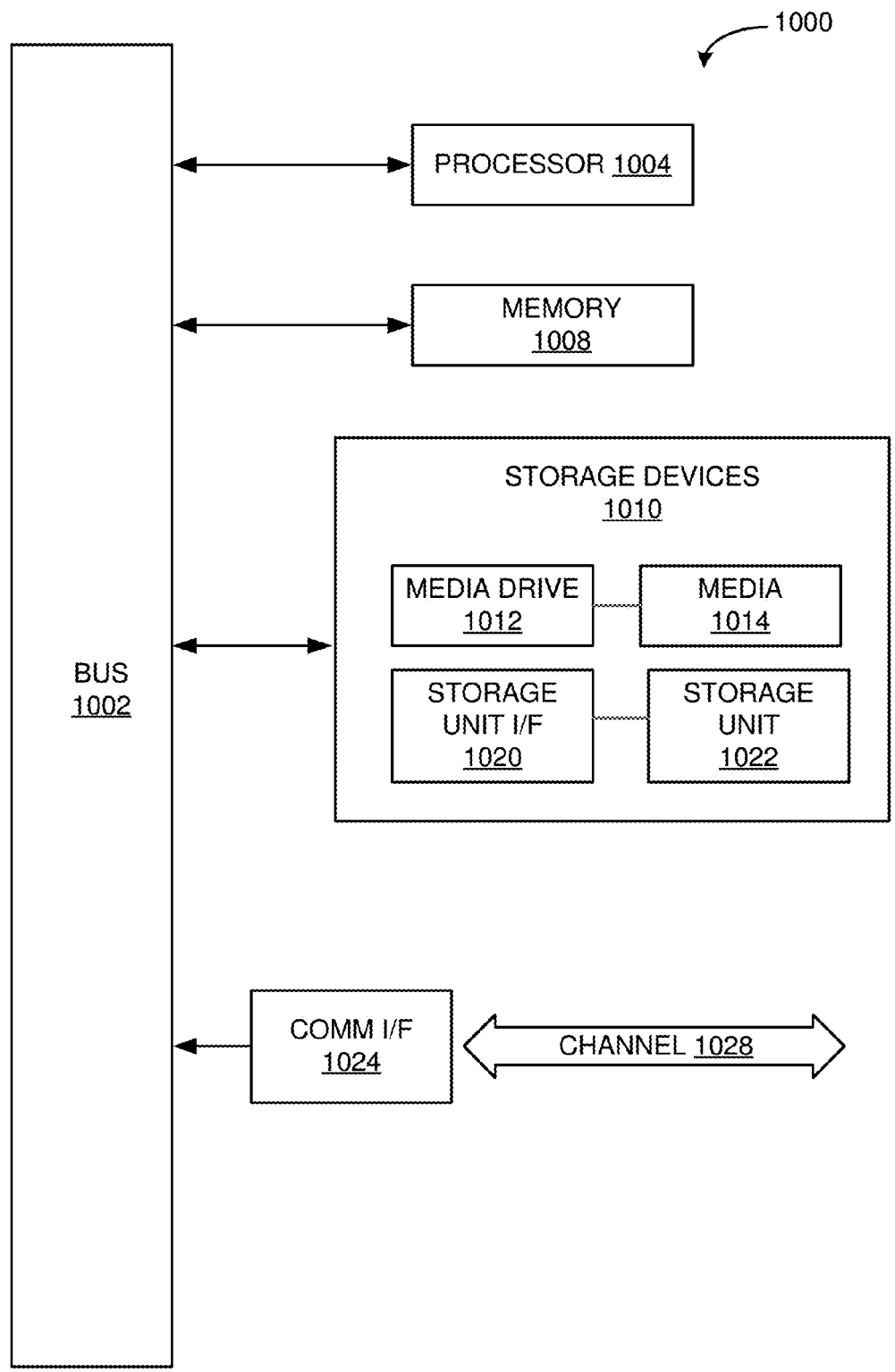
FIG. 13 illustrates an example computing module that may be used to implement various features of the methods disclosed herein.

FIG. 13 illustrates an example computing module that may be used to implement various features of the systems and methods disclosed herein. As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example-computing module 1000. After reading this description, it will become apparent to a person skilled in the relevant art how to implement the application using other computing modules or architectures.

Referring now to FIG. 13, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical disk drive, a CD, DVD, or Blu-ray drive (R or RW), or other removable or fixed media drive might be provided. Accordingly, storage media 1014 might include, for example, a hard disk, a solid state drive, magnetic tape, cartridge, optical disk, a CD, DVD, Blu-ray or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   receiving a source image at a non-transitory computer readable medium; and
   one or more processors creating a continuous dynamic range image by defining a luminance of each pixel of the source image as a continuous function based on a minimum dynamic range and a maximum dynamic range, wherein the continuous function comprises a dynamic range continuum between the minimum dynamic range and the maximum dynamic range.

2. The method of claim 1, wherein creating the continuous dynamic range image further comprises the one or more processors grading the source image for the minimum dynamic range and the maximum dynamic range.

3. The method of claim 2, wherein the source image is a video frame, and wherein the continuous dynamic range image is a continuous dynamic range video frame.

4. The method of claim 3, wherein the continuous function is a lumipath that represents a pixel's luminance value as a function of the peak luminance of a target display.

5. The method of claim 3, further comprising displaying on a display a graphical user interface that allows a user to define or modify the continuous function.

6. The method of claim 1, further comprising the one or more processors compressing the continuous dynamic range image by approximating each of the continuous functions using a truncated polynomial series.

7. The method of claim 3, further comprising the one or more processors compressing the continuous dynamic range video frame by approximating each of the continuous functions using a truncated polynomial series.

8. The method of claim 7, wherein the polynomial series is a Chebyshev polynomial series.

9. The method of claim 7, further comprising representing the polynomial coefficients of the truncated polynomial series in an image-like format.

10. The method of claim 9, further comprising encoding the image-like formatted polynomial coefficients using a video codec.

11. The method of claim 3, wherein the maximum dynamic range corresponds to a maximum dynamic range of a plurality of target displays each having an associated dynamic range, and wherein the minimum dynamic range corresponds to a minimum dynamic range of the plurality of target displays.

12. A system, comprising:
   one or more processors; and
   one or more non-transitory computer-readable mediums operatively coupled to at least one of the one or more processors and having instructions stored thereon that, when executed by at least one of the one or more processors, cause the system to:
   receive a source image; and
   create a continuous dynamic range image by defining a luminance of each pixel of the source video frame as a continuous function based on a minimum dynamic range and a maximum dynamic range, wherein the continuous function comprises a dynamic range continuum between the minimum dynamic range and the maximum dynamic range.

13. The system of claim 12, wherein the source image is a video frame, and wherein the continuous dynamic range image is a continuous dynamic range video frame.

14. The system of claim 13, wherein creating the continuous dynamic range video frame comprises grading the source video frame for the minimum dynamic range and the maximum dynamic range.

15. The system of claim 14, wherein the continuous function is a lumipath that represents a pixel's luminance value as a function of the peak luminance of a target display.

16. The system of claim 13, further comprising a display, and wherein the instructions when executed by at least one of the one or more processors, further cause the system to: display on the display a graphical user interface that allows a user to define or modify the continuous function.

17. The system of claim 13, wherein the instructions when executed by at least one of the one or more processors, further cause the system to: compress the continuous dynamic range video frame by approximating each of the continuous functions using a truncated polynomial series.

18. The system of claim 17, wherein the polynomial series is a Chebyshev polynomial series.

19. A graphical user interface method for creating continuous dynamic range images or video, comprising:
   displaying on one or more displays of a computer system:
      a plurality of graded versions of an image, wherein each of the graded versions is graded for a different dynamic range display; and
      a control for modifying a continuous function defining the luminance of a first set of pixels of the image as a continuous function based on a minimum dynamic range and a maximum dynamic range, wherein the continuous function comprises a dynamic range continuum between the minimum dynamic range and the maximum dynamic range;
   receiving user input at the computer system actuating the control for modifying the continuous function; and
   in response to receiving the user input actuating the control for modifying the continuous function, the computer system displaying a modified version of each of the plurality of graded versions of the image on the one or more displays.

20. The graphical user interface method of claim 19, wherein the image is a first video frame corresponding to a video.

21. The method of claim 19, wherein the continuous function is a lumipath that represents a pixel's luminance value as a function of the peak luminance of a target display.

22. The method of claim 19, wherein the continuous function defining the luminance of the first set of pixels of the image is associated with a first user-selectable mask, and further comprising displaying the first user-selectable mask.

23. The method of claim 22, further comprising receiving user input at the computer system selecting a second mask associated with a second continuous function defining the luminance of a second set of pixels of the image as a continuous function based on a minimum dynamic range and a maximum dynamic range.

24. The method of claim 19, further comprising receiving user input at the computer system selecting a maximum graded version of the image and selecting a minimum graded version of the image.

25. The method of claim 20, further comprising:
receiving user input at the computer system selecting a second video frame corresponding to the video; and
in response to receiving the user input selecting a second video frame, the computer system causing the one or more displays to display a plurality of graded versions of the second video frame, wherein each of the graded versions is graded for a different dynamic range display.

26. A system, comprising:
a display;
one or more processors; and
one or more non-transitory computer-readable mediums operatively coupled to at least one of the one or more processors and having instructions stored thereon that, when executed by at least one of the one or more processors, cause the system to:
display a graphical user interface on the display comprising:
a plurality of graded versions of an image, wherein each of the graded versions is graded for a different dynamic range display; and
a control for modifying a continuous function defining the luminance of a first set of pixels of the image as a continuous function based on a minimum dynamic range and a maximum dynamic range, wherein the continuous function comprises a dynamic range continuum between the minimum dynamic range and the maximum dynamic range;
receive data corresponding to user input actuating the control for modifying the continuous function; and
in response to receiving the data corresponding to the user input actuating the control for modifying the continuous function, display on the display a modified version of each of the plurality of graded versions of the image.

27. The system of claim 26, wherein the continuous function is a lumipath that represents a pixel's luminance value as a function of the peak luminance of a target display.

28. The system of claim 26, wherein the continuous function defining the luminance of the first set of pixels of the image is associated with a first user-selectable mask, and wherein the instructions when executed by at least one of the one or more processors, further cause the system to: display on the display the first user-selectable mask.

29. The system of claim 28, wherein the instructions when executed by at least one of the one or more processors, further cause the system to: receive data corresponding to user input selecting a second mask associated with a second continuous function defining the luminance of a second set of pixels of the image as a continuous function based on a minimum dynamic range and a maximum dynamic range.

30. The system of claim 26, wherein the instructions when executed by at least one of the one or more processors, further cause the system to: receive data corresponding to user input selecting a maximum graded version of the image and selecting a minimum graded version of the image.

31. The system of claim 26, wherein the image is a first video frame corresponding to a video, and wherein the instructions when executed by at least one of the one or more processors, further cause the system to:
receive data corresponding to user input selecting a second video frame corresponding to the video; and
in response to receiving the data corresponding to the user input selecting a second video frame, displaying on the display a plurality of graded versions of the second video frame, wherein each of the graded versions is graded for a different dynamic range display.

32. A method of compressing and encoding continuous dynamic range video, comprising:
receiving:
a minimum dynamic range graded image corresponding to a video frame;
a maximum dynamic range graded image corresponding to the video frame; and
metadata including a continuous dynamic range function for every pixel of the video frame;
representing each of the continuous dynamic range functions using a vector of coefficients of a truncated polynomial series approximating the continuous dynamic range function; and
representing the vector of coefficients in an image format.

* * * * *